Sept. 21, 1948.　　　G. N. BRETT ET AL　　2,449,838
VALVE SUITABLE FOR USE WITH CATHODE-RAY
TUBES AND FOR OTHER PURPOSES
Filed Dec. 19, 1946　　　　　　　　　　2 Sheets-Sheet 1
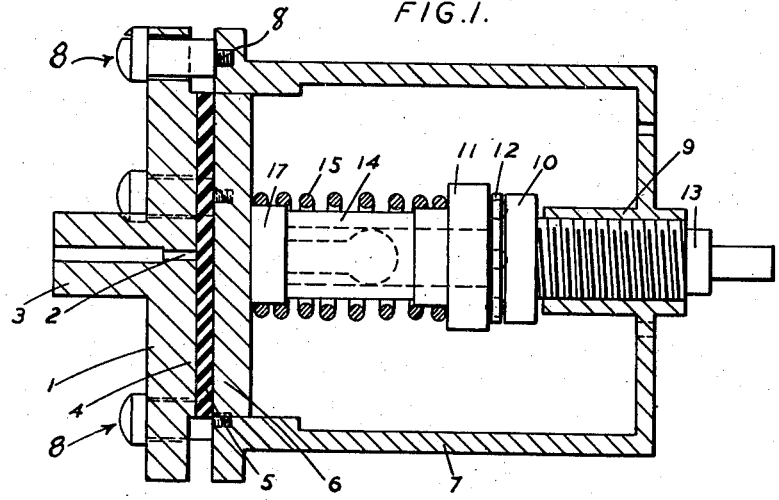
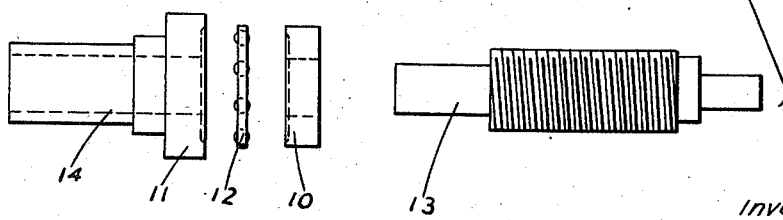
Inventor
George N. Britt
by Ernest A. Smith
Stebbins Blenko & Webb
Attorney Sept. 21, 1948.　　　G. N. BRETT ET AL　　　2,449,838
VALVE SUITABLE FOR USE WITH CATHODE-RAY
　　TUBES AND FOR OTHER PURPOSES
Filed Dec. 19, 1946　　　　　　　　　　2 Sheets-Sheet 2
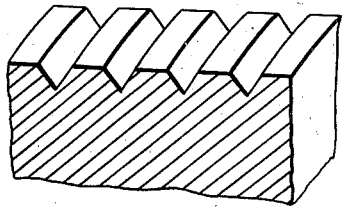
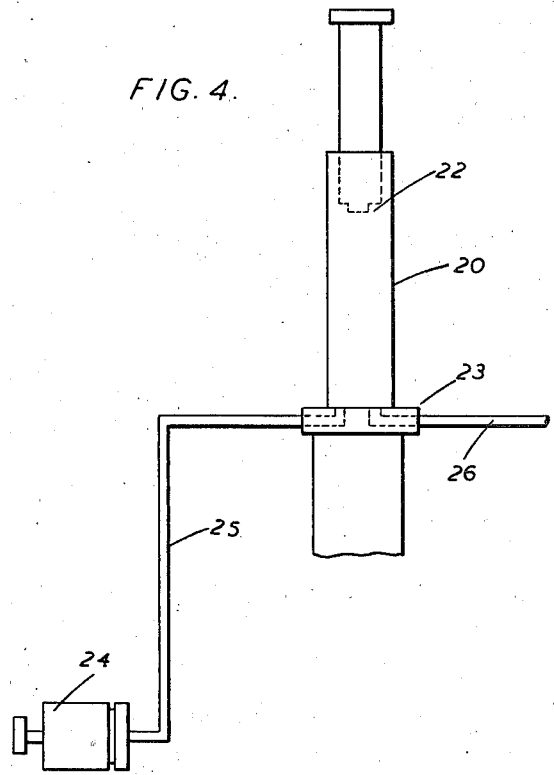

Patented Sept. 21, 1948

2,449,838

UNITED STATES PATENT OFFICE 2,449,838

VALVE SUITABLE FOR USE WITH CATHODE-RAY TUBES AND FOR OTHER PURPOSES

George Noel Brett and Ernest Alfred Smith, Gravesend, England, assignors to W. T. Henley's Telegraph Works Company Limited, London, England, a British company Application December 19, 1946, Serial No. 717,238
In Great Britain February 21, 1946

2 Claims. (Cl. 250—27.5)

This invention relates to valves for the accurate control of the flow of fluid which is moving at a very low rate. It is particularly, but not exclusively, applicable to the control of the pressure in the discharge chamber of a cathode ray tube working with a cold cathode. In such a tube an important factor controlling the strength of the current in the beam is the pressure in the discharge chamber. This may be about $10^{-2}$ mm. of mercury and is determined by attaining a balance between outward flow under continuous exhaustion and inward flow through a valve-controlled passage. Since the beam current is proportional to a high power of the value of this pressure it is important that accurate and reliable control of the inward leak should be available. Hitherto this has been regarded as a difficult problem and has generally been dealt with by providing that the leak takes place from a container at low pressure. By the valve of the present invention accurate and reliable control is obtained of a leak from atmospheric pressure by means of a very simple construction.

The preceding description will indicate by example the class of service to which the improved valve is adapted. Also included in this class are cathode sputtering apparatus and electron diffraction cameras working with cold cathodes.

The valve comprises a rigid plate member, having a central aperture and a long narrow groove in one face going in a circuitous path (for instance, a spiral) from the aperture outwards, in combination with a disc of rubber having a plain face and means for pressing adjustably the plain face of the disc against the grooved face of the plate member. The fluid flow takes place along the groove between the central aperture and the exterior region and is regulated by the pressing of the rubber disc into the groove to a greater or less extent, the groove dimensions and the qualities of the rubber being appropriately chosen for this purpose. It is found that in this way the flow may be completely shut off or throttled to a desired extent through a range of values which are substantially constant for given settings of the control member, that is for given values of the pressure on the rubber disc.

The groove can conveniently be made by turning a shallow spiral of fine pitch and V section on the flat face of a plate.

The term "rubber" is used here and in the claims in its broad sense as indicating a material having certain physical properties: it includes vulcanised natural rubber and the so-called synthetic rubber and rubber substitutes which have these properties. The principal requirements are elastic deformation with low permanent set and low creep so that when pressed against the grooved face it enters at once into the groove to an extent and this extent does not vary appreciably with time of maintenance of the setting of the adjustment and changes at once on variation of the setting. A fairly hard grade of rubber is preferable in order to provide a sufficiently large range of pressure variation for convenient exertion of fine control.

An example of a suitable rubber mix from which the disc is formed is as follows:

| | Parts by weight |
|---|---|
| Neoprene | 100 |
| Carbon black | 100 |
| Stearic acid | 1 |
| Light magnesium oxide | 4 |
| Phenyl α naphthylamine | 2 |
| Zinc oxide | 5 |

The mix is cured for 40 minutes at 142 degrees C.

A valve for controlling the leakage of air into the discharge chamber of a cathode ray tube working with a cold cathode will hereinafter be described as an example with reference to the accompanying drawings, in which—

Figure 1 is an elevation in cross section and

Figure 2 is an elevation of parts of the valve separated to show their construction.

Figure 3 is a perspective view of part of the rigid plate member, and

Figure 4 is a diagrammatic drawing showing the valve in use.

The valve comprises a rigid brass plate 1 formed with a central aperture 2 which passes through an integral boss 3. The plate is formed with a circular raised part 4 on the surface of which there is cut a spiral groove starting at the aperture 2 and finishing at the outer edge of the part 4. Figure 3 is an enlarged view of part of the plate 1 showing the groove in its surface. This groove is 15 metres long and of V section. The area of cross section of the groove is .000032 sq. cm. A plain surfaced rubber disc 5 of 6.4 cms. diameter, the same diameter as the part 4, and .3 cms. thick is pressed against the grooved face by a brass disc 6 which is a sliding fit in a cylindrical chamber 7. The chamber 7 is mounted on the plate 1 and held in position by screws 8. An internally threaded sleeve 9 is formed integrally with the closed end of the chamber 7. Inside the chamber 7 is a thrust bearing consisting of steel plates 10 and 11 and a ball race 12. The plate 10 is mounted on a threaded rod 13, passing through the sleeve 9. A brass sleeve 14 is mounted on the plate 11 and a spring 15 is carried between the plate 11 and the disc 6. A ball ended projection 16 on the disc 6 slides inside the sleeve 14.

The valve, as shown in Figure 1, is closed, sufficient pressure being applied to the disc 6 to force the rubber of the disc 5 into the grooves formed in the plate 1 and close them. In this position the end of the sleeve 14 bears against a raised part 17 of the disc 6. The valve is opened by rotating the rod 13 by a suitable key or handle applied to its projecting end to decrease this pressure. The sleeve 14 then moves away from the part 17 but pressure is still applied to the disc 6 by the spring 15. This pressure, and hence the amount by which the plain surface of the rubber disc 5 is pressed into the spiral groove in the plate 1, can be further regulated by rotating the rod 13. When the valve is open air passes between the plate 1 and the chamber 7 into the spiral groove in the plate 1 and through the aperture 2 into the cathode ray tube discharge chamber to which the valve is connected.

Referring to Figure 4, the discharge chamber of the cathode ray tube is in the form of a tube 20, in the upper end of which is mounted the cathode 22. The lower end of the tube is mounted on the anode block 23. An air leak valve 24 of the kind described above is connected by a pipe 25 to an aperture passing through the anode block 23 into the discharge chamber. To a second aperture passing through the anode block 22, is connected a pipe 26 leading to a vacuum pump. By regulating the valve 24 a leakage of air into the discharge chamber at the desired rate can be obtained.

With the valve described, when the pressure in the discharge chamber is $10^{-2}$ mm. of mercury it is possible to obtain a rate of flow, from the atmosphere, of 1 to 2 litres per second at the lower pressure.

What we claim as our invention is:

1. A cold cathode electronic discharge device comprising a discharge chamber, a valve for controlling the rate of leakage of air direct from the atmosphere into said discharge chamber, an inlet for said valve open to the atmosphere and an outlet for said valve connected to said discharge chamber, said valve comprising a rigid plate member, having a central aperture and a long narrow groove in one face going in a spiral path from the aperture outwards, in combination with a disc of rubber having a plain face and means for pressing adjustably the plain face of the disc against the grooved face of the plate member to control the flow of air through the groove.

2. A cold cathode electronic discharge device comprising a discharge chamber, a valve for controlling the rate of leakage of air direct from the atmosphere into said discharge chamber, an inlet for said valve open to the atmosphere and an outlet for said valve connected to said discharge chamber, said valve comprising a rigid plate member, having a central aperture and a long narrow groove in one face going in a spiral path from the aperture outwards, in combination with a disc of rubber having a plain face and means for pressing adjustably the plain face of the disc against the grooved face of the plate member to control the flow of air through the groove, the length of the groove in metres being in the order of $5 \times 10^5$ time its cross sectional area in square centimetres.

GEORGE NOEL BRETT.
ERNEST ALFRED SMITH.

REFERENCES CITED

The following references are of record in the file of this patent:

UNITED STATES PATENTS

| Number | Name | Date |
|---|---|---|
| 1,572,469 | Delin | Feb. 6, 1926 |
| 1,946,734 | Delin | Feb. 13, 1934 |
| 1,964,300 | Perry | June 26, 1934 |
| 2,276,639 | Ackermann | Mar. 17, 1942 |
| 2,289,905 | Dasher | July 14, 1942 |